(12) United States Patent
Josset et al.

(10) Patent No.: US 12,054,281 B2
(45) Date of Patent: Aug. 6, 2024

(54) AUXILIARY POWER UNIT FOR AN AIRCRAFT

(71) Applicants: Airbus Operations SAS, Toulouse (FR); Airbus SAS, Blagnac (FR); Airbus Operations GmbH, Hamburg (DE)

(72) Inventors: Thomas Josset, Toulouse (FR); Didier Poirier, Blagnac (FR); Holger Bammann, Hamburg (DE); Thomas Scherer, Hamburg (DE)

(73) Assignees: Airbus Operations SAS, Toulouse (FR); Airbus SAS, Blagnac (FR); Airbus Operations GmbH, Hamburg (DE)

( * ) Notice: Subject to any disclaimer, the term of this patent is extended or adjusted under 35 U.S.C. 154(b) by 99 days.

(21) Appl. No.: 17/982,567

(22) Filed: Nov. 8, 2022

(65) Prior Publication Data
US 2023/0147038 A1 May 11, 2023

(30) Foreign Application Priority Data
Nov. 10, 2021 (FR) .................................. 2111968

(51) Int. Cl.
*B64D 41/00* (2006.01)
*B60L 58/33* (2019.01)
(Continued)

(52) U.S. Cl.
CPC ............. *B64D 41/00* (2013.01); *B60L 58/33* (2019.02); *B64D 13/06* (2013.01);
(Continued)

(58) Field of Classification Search
CPC ................................................ B64D 2041/005
See application file for complete search history.

(56) References Cited

U.S. PATENT DOCUMENTS

2016/0347456 A1\* 12/2016 Bruno .................... B64D 13/06
2016/0362999 A1\* 12/2016 Ho ......................... B64D 41/00
(Continued)

FOREIGN PATENT DOCUMENTS

| EP | 3182490 A1 | 6/2017 |
| GB | 2522865 A | 8/2015 |

OTHER PUBLICATIONS

M.D. Fernandes, et al. "SOFC-APU systems for aircraft: A review," international journal of hydrogen energy 4 3 ( 2018 ) 16311-16333 (Year: 2018).\*
(Continued)

*Primary Examiner* — David P. Olynick
(74) *Attorney, Agent, or Firm* — Greer, Burns & Crain, Ltd.

(57) ABSTRACT

An auxiliary power unit for an aircraft. It includes an air compressor coupled to an air-drawing device for drawing in air from outside the aircraft, the compressor supplying compressed air to a manifold. The manifold is configured to supply air to an environmental control system and a start-up module of at least one propulsion system of the aircraft running on hydrogen. The manifold is also configured to supply air to a fuel cell stack arranged to provide an electric generation function configured to power non-propulsive systems of the aircraft, the fuel cell stack also being supplied with hydrogen from a tank supplying hydrogen to the at least one propulsion system of the aircraft.

10 Claims, 2 Drawing Sheets

(51) Int. Cl.
  *B64D 13/06* (2006.01)
  *H01M 8/04007* (2016.01)
  *H01M 8/04029* (2016.01)
  *H01M 8/04111* (2016.01)
  *H01M 8/04664* (2016.01)
  *H01M 8/04746* (2016.01)

(52) U.S. Cl.
  CPC ... *H01M 8/04029* (2013.01); *H01M 8/04074* (2013.01); *H01M 8/04111* (2013.01); *H01M 8/04664* (2013.01); *H01M 8/04753* (2013.01); *H01M 8/04776* (2013.01); *B60L 2200/10* (2013.01); *B64D 2013/0611* (2013.01); *B64D 2041/005* (2013.01); *H01M 2250/20* (2013.01)

(56) References Cited

U.S. PATENT DOCUMENTS

| | | |
|---|---|---|
| 2017/0170494 A1 | 6/2017 | Lents et al. |
| 2017/0328282 A1* | 11/2017 | Jensen .................... F02C 7/275 |
| 2019/0252696 A1 | 8/2019 | Boudjemaa et al. |
| 2019/0393531 A1 | 12/2019 | Hoffjann et al. |
| 2020/0391876 A1 | 12/2020 | Morrison |
| 2021/0254545 A1* | 8/2021 | Ajami .................... B64D 13/06 |
| 2021/0276725 A1* | 9/2021 | Lima ...................... B64D 31/00 |
| 2021/0340908 A1* | 11/2021 | Boucher .................. F02C 7/06 |
| 2023/0120297 A1* | 4/2023 | Butler ...................... F02C 6/08 |
| | | 290/52 |

OTHER PUBLICATIONS

French Search Report dated Jun. 2, 2022; priority document.

\* cited by examiner

AUXILIARY POWER UNIT FOR AN AIRCRAFT

CROSS-REFERENCES TO RELATED APPLICATIONS

This application claims the benefit of the French patent application No. 2111968 filed on Nov. 10, 2021, the entire disclosures of which are incorporated herein by way of reference.

FIELD OF THE INVENTION

At least one embodiment relates to an auxiliary power unit for an aircraft, comprising an air compressor coupled to an air-drawing device for drawing in air from outside the aircraft. At least one other embodiment relates to an aircraft comprising such an auxiliary power unit.

BACKGROUND OF THE INVENTION

In the field of aeronautics, an auxiliary power unit (APU) denotes an auxiliary unit which provides energy for functions other than propulsion. Notably, it is intended to produce electrical energy and pneumatic energy (energy stored in a compressed gas) on board aircraft to power the various on-board systems (e.g., cabin lighting system, air conditioning, ventilation, etc.) on the ground when the main propulsion systems are stopped in order to save fuel. The pneumatic energy thus produced is also used to start the propulsion systems of the aircraft. Such an auxiliary power unit can also be used in flight.

Auxiliary power units are generally positioned at the rear of the aircraft in the tail cone in order to reduce their noise impact for the passengers. They are supplied with kerosene from tanks in the aircraft. Thus, auxiliary power units consume some of the kerosene of the aircraft and contribute to the greenhouse gas emissions in aviation.

A new generation of aircraft running on dihydrogen are currently being developed. These new aircraft are less polluting since they essentially discharge water vapor. Therefore, supplying an auxiliary power unit in such aircraft with kerosene would be illogical for environmental issues. Supplying the auxiliary power unit with dihydrogen would require the fitting of a dihydrogen supply circuit between the tail of the aircraft and the dihydrogen tank generally situated in the vicinity of the wings of the aircraft. Such an architecture would pose safety problems linked to the risks of dihydrogen leaking and exploding along the dihydrogen supply circuit.

It is therefore desirable to provide a solution which overcomes these various drawbacks of the prior art. More particularly, it is desirable to provide a solution for electrically and pneumatically powering non-propulsive functions on board an aircraft which produces little pollution, little noise and is safe.

SUMMARY OF THE INVENTION

At least one embodiment relates to an auxiliary power unit for an aircraft, comprising an air compressor coupled to an air-drawing device for drawing in air from outside the aircraft. The compressor supplies compressed air to a manifold configured to supply air to an environmental control system and a start-up module of at least one propulsion system of the aircraft, the propulsion system being supplied with hydrogen from a tank. The manifold is also configured to supply air to a fuel cell stack arranged so as to provide an electric generation function intended to power non-propulsive systems of the aircraft, the fuel cell stack also being supplied with hydrogen from the tank.

Advantageously, an inlet of the manifold is coupled to an outlet of a bleed air system configured to draw in air from the at least one propulsion system, and the manifold is controlled by a processing unit such that, when the propulsion system is operating, the manifold supplies the fuel cell stack and the environmental control system with a mixture of air coming from the compressor and from the propulsion system.

According to a particular embodiment, the processing unit is also configured to command the shutting-down of the compressor during operation of the propulsion system, in particular during flight phases of the aircraft during which the air flow rate drawn from at least one propulsion system is sufficient for supplying pressurized air to the fuel cell stack and the environmental control system.

According to a particular embodiment, the fuel cell stack is coupled to a cooling circuit in which a cooling liquid circulates, the cooling circuit being configured such that, when the fuel cell stack is operating with release of heat, the heat heats the cooling liquid.

According to a particular embodiment, an outlet of the cooling circuit is coupled to an inlet of a heat exchanger, through which the hydrogen supplying the fuel cell stack circulates, such that at least a portion of the heated cooling liquid circulates in the heat exchanger and heats the hydrogen supplying the fuel cell stack.

According to a particular embodiment, a portion of the hydrogen circulating through the heat exchanger supplies the at least one propulsion system during a start-up phase.

According to a particular embodiment, a processing unit of the auxiliary power unit is configured to obtain information relating to the air requirements of the environmental control system and of the fuel cell stack. The processing unit also controls the manifold such that it supplies air to the cell stack and the environmental control system as a function of the obtained information.

According to a particular embodiment, at least a portion of the air at the outlet of the fuel cell stack is injected into at least one compartment of the at least one propulsion system.

According to a particular embodiment, the auxiliary power unit and the at least one propulsion system are co-located.

An aircraft comprising at least one auxiliary power unit according to any one of the preceding embodiments is described.

An aircraft comprising a first auxiliary power unit according to any one of the preceding embodiments and a second auxiliary power unit according to any one of the preceding embodiments is described. The first and second auxiliary power units are connected by a cross-feed system.

BRIEF DESCRIPTION OF THE DRAWINGS

The above-mentioned features of the invention, together with others, will become more clearly apparent upon reading the following description of an exemplary embodiment, the description being given with reference to the appended drawings, in which.

DETAILED DESCRIPTION OF THE PREFERRED EMBODIMENTS

Figure 1:
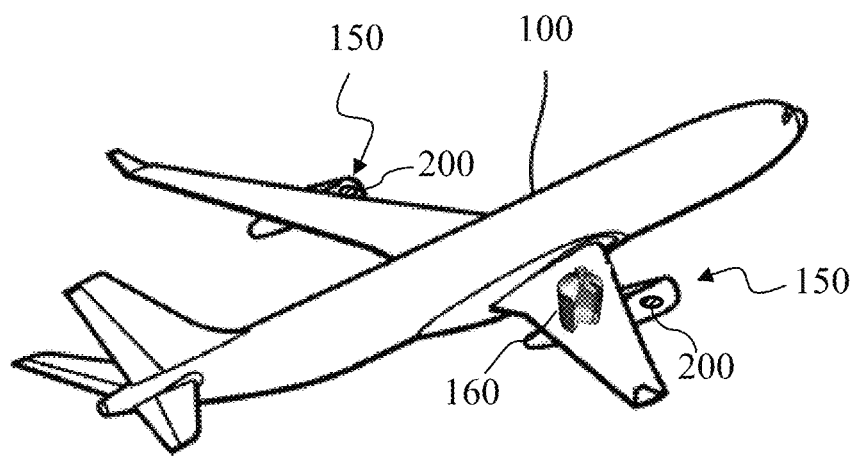
FIG. 1 is a perspective view of an aircraft according to a particular embodiment.
Figure 2:
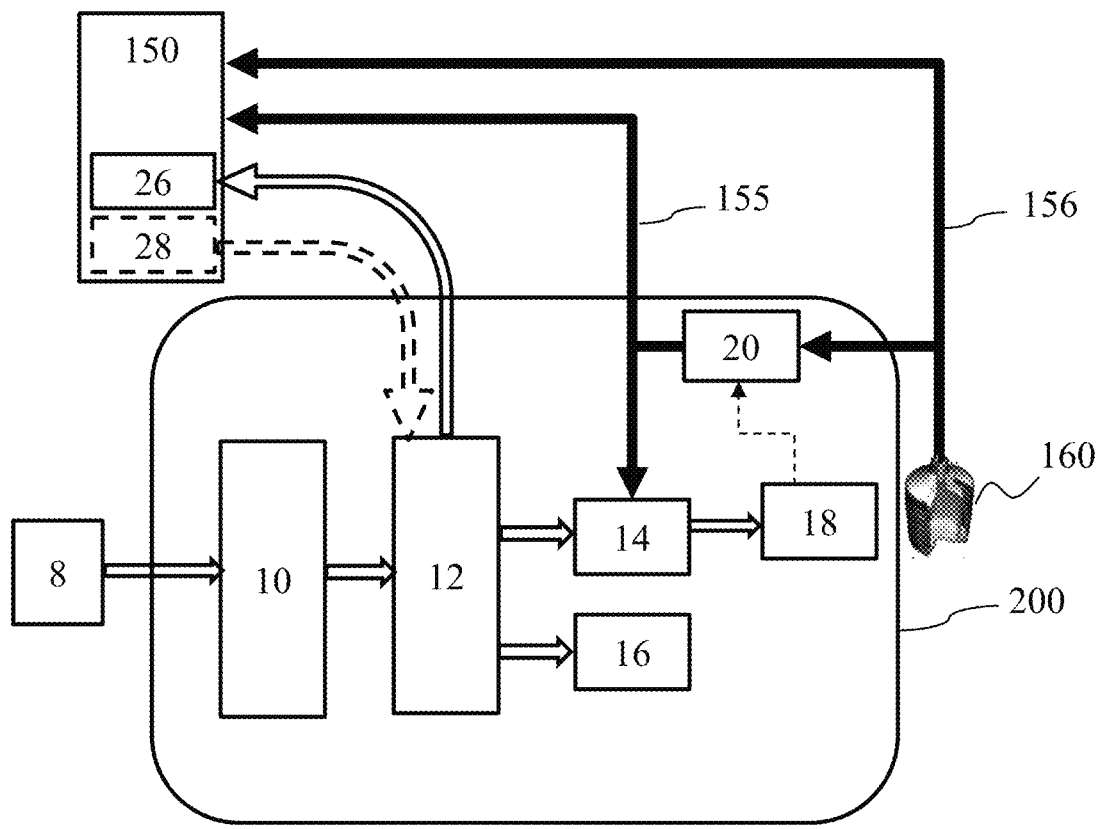
FIG. 2 is a schematic depiction of an auxiliary power unit according to a particular embodiment.

FIG. 1 shows a perspective view of an aircraft 100 having a fuselage on either side of which is fixed a wing. Fixed below each wing is at least one propulsion system 150, e.g., a turbofan or a turboprop, supplied with dihydrogen from a tank 160 for example located in one of the wings. In FIG. 1, the aircraft 100 comprises two propulsion systems 150, one below each wing. In another embodiment, they may be above the wing. Each propulsion system 150 is arranged, and installed, on the aircraft to provide a propulsion power to the aircraft 100. The aircraft further comprises at least one auxiliary power unit 200 as illustrated in FIG. 2. The auxiliary power unit 200 notably comprises a fuel cell stack 14 supplied with dihydrogen and dioxygen, and an environmental control system (ECS) 16 supplied with dioxygen. The auxiliary power unit 200 is used to supply electric and pneumatic energy to non-propulsive systems of the aircraft (for example: lighting, ventilation of a passenger cabin and/or air conditioning of the cabin, etc.), that is to say equipment not associated with the propulsion of the aircraft 100. More precisely, the electrical energy produced by the fuel cell stack 14 is notably used for lighting and cabin control even before start-up of the aircraft. The pneumatic energy is notably used by the environmental control system 16 for ventilation, air conditioning of the cabin, control of the temperature and pressurization of the cabin for the crew and passengers. This pneumatic energy is also the main source of energy used for start-up of propulsion systems 150. In the text which follows, the terms oxygen and dioxygen are used interchangeably. Likewise, the terms hydrogen and dihydrogen are used interchangeably.

FIG. 2 is a schematic depiction of an auxiliary power unit 200 according to a particular embodiment. In this figure, the thick black arrows relate to a hydrogen distribution circuit and the thick white arrows relate to an air, notably oxygen, distribution circuit.

The auxiliary power unit 200 comprises a compressor 10, for example an electric compressor, coupled to a manifold 12 via at least one air duct. The manifold, also known by the term collector, is configured to distribute the air flow that it receives at the inlet to several devices at the outlet. The oxygen used in the auxiliary power unit 200, e.g., by the fuel cell stack 14, comes, for example, from ambient air pressurized by the compressor 10, the pressurized air serving to supply a manifold 12. The ambient air comes, for example, from an air-drawing device 8 comprising one or more scoops which are situated in the vicinity of the compressor 10.

The manifold 12, for its part, supplies air, thus dioxygen, to the fuel cell stack 14 and the environmental control system 16. Furthermore, the manifold 12 supplies pressurized air to a start-up module 26 of the propulsion system 150.

The environmental control system 16 is a system that is conventionally used in an aircraft and its internal architecture is not described in detail in this instance insofar as it is not useful for the comprehension of the invention. Notably, the environmental control system 16 comprises an exterior air outlet for ejecting air drawn from the cabin and the cockpit.

The fuel cell stack 14 is furthermore supplied with hydrogen from the tank 160 by means of the dihydrogen distribution circuit.

A fuel cell is a cell in which an electric voltage is generated by virtue of the oxidation of a reducing fuel, in this case the dihydrogen, on an anode, combined with the reduction of an oxidant, in this case the dioxygen from the air, on a cathode. The dioxygen is provided by the manifold 12, e.g., at a pressure of 2 bar. The two electrodes are in contact with a membrane, which acts as an electrolyte, thus ensuring the transportation of ions produced at the anode. Specifically, the oxidation of the dihydrogen at the anode produces H+ ions and electrons e− which pass from the anode to the cathode. On arrival at the anode, the dihydrogen (H2) dissociates (oxidation) into H+ ions and into electrons according to the following reaction: 2H2=4H++4e−. The H+ ions migrate into the membrane and the electrons pass around an exterior circuit, thus producing electrical energy. At the cathode, the H+ ions, the electrons e−, and dioxygen (e.g., coming from the air) meet to form water according to the following reaction: 4H++4e−+O2=2H2O. During this reaction, heat is released. Air not used by the fuel cells in the chemical reaction is for example discharged to outside the aircraft.

The hydrogen is, for example, stored in liquid form in the tank 160 at a temperature of 20 kelvin and a pressure of 3 bar. The liquid hydrogen is vaporized by means of a capsule which is in contact with the tank 160. The capsule is a hermetically sealed chamber in which a vacuum prevails that allows the pressure and temperature of the hydrogen in the hydrogen circuit to be regulated. Hydrogen not used by the fuel cells in the chemical reaction is for example returned to the hydrogen circuit. Without leaving the scope of the invention, the hydrogen may also be stored directly in gaseous form in the tank 160.

The fuel cells are cooled by a cooling circuit 18. Specifically, the chemical reactions in the fuel cells produce heat which needs to be removed in order to not overheat the cells. To this end, the cooling circuit 18 is supplied with cooling liquid. The cooling liquid is, for example, a mixture of water and of glycol, e.g., of the EGW (Ethylene Glycol Water) type. The outlet of the cooling circuit 18 is coupled to the inlet of a heat exchanger 20 in order to remove the heat.

At least a portion of the heat produced serves to increase, by means of the heat exchanger 20, the temperature of the hydrogen at the outlet of the tank so as to bring the temperature to an adequate value, e.g., of from 200 to 350° K, suitable for the operation of the fuel cell stack 14. By virtue of the hydrogen passing through the heat exchanger 20, the cooling liquid coming from the fuel cells and circulating in the heat exchanger 20 is cooled, while the hydrogen is heated.

In a variant, a portion of the heat produced is removed to outside the installation. In this embodiment, the heat exchanger 20 is also supplied with fresh air from outside by one or more scoops on the exterior skin of the aircraft. The scoops may be distributed over the perimeter of the exterior skin and may for example be of the NACA type or of a type that lies flush with the exterior skin. By virtue of the fresh air passing through the heat exchanger 20, the cooling liquid coming from the fuel cells and circulating in the heat exchanger 20 is cooled, while the fresh air is heated. The heat exchanger 20 therefore discharges the hot air to outside the aircraft, for example via a jet pipe. According to one embodiment, the heat exchanger is disposed in a ram air duct of the aircraft.

The operation of the various elements of the auxiliary power unit 200 is controlled by a processing unit (not shown in FIG. 2). The exchanges of information with this processing unit may be effected by using a network internal to the aircraft or a dedicated communication bus. Furthermore, the various air and hydrogen distribution circuits conventionally comprise pumps and valves (not shown in FIG. 2) which are also controlled by the processing unit.

The propulsion system 150 also runs on hydrogen. In one exemplary embodiment, the propulsion system 150 is a hydrogen-combustion propulsion system.

Hydrogen from the heat exchanger 20 is sent to the engine 150 through a pipe 155 for supplying hydrogen to the engine during a start-up phase. To this end, the hydrogen is evaporated by heating by means of the heat exchanger 20. In other words, the heat generated by the fuel cell stack 14 is advantageously used to heat the hydrogen supplying the propulsion system 150 by means of the heat exchanger 20. Thus, the fact that the fuel cell stack 14 is co-located with the heat exchanger 20 and the propulsion system 150 makes it possible to minimize heat losses. The term co-located should be understood to mean a spatial proximity of the fuel cell stack 14 and the propulsion system 150 (respectively, the heat exchanger 20).

A pipe 156 also makes it possible to send hydrogen from the tank 160 to the engine 150 during operation of the engine, that is to say after start-up thereof.

In a particular embodiment in which the propulsion system or systems 150 are operating, the manifold 12 is controlled by the processing unit to supply the fuel cell stack 14 and the environmental control system 16 with a mixture of air coming from the compressor 10 and from the propulsion system or systems 150. The drawing of air from the propulsion system or systems 150 in this way is effected by a bleed air system 28. To this end, an inlet of the manifold 12 is coupled to an outlet of the bleed air system 28. This embodiment makes it possible to use the energy from the propulsion system 150, and thus to switch off the compressor 10. It also makes it possible to compensate for any faults in one or other of the pressurized air sources.

In a particular embodiment, the processing unit obtains information relating to the air requirements of the environmental control system 16 and of the cell stack 14. Specifically, the air requirements may vary over time. For example, the requirements of the environmental control system 16 may vary as a function of the flight altitude, the exterior temperature and the number of passengers on board the aircraft. The processing unit controls the manifold such that it supplies the cell stack 14 and the environmental control system as a function of the obtained information relating to their respective air requirements.

In a particular embodiment, the air or a portion of the air at the outlet of the cell stack, which is oxygen-depleted air, is transmitted to the propulsion systems 150 in order to serve as a fire barrier. Notably, this oxygen-depleted air may advantageously be injected into those compartments of the propulsion systems 150 in which a hydrogen leak is liable to occur, and thus limit the risks of explosion.

In a particular embodiment, the fuel cell stack 14 in FIGS. 1 and 2 is advantageously coupled to an electrical energy storage system comprising batteries and/or capacitors.

In a particular embodiment, the auxiliary power unit 200 and the propulsion system 150 with which it is associated are co-located, i.e., spatially close to one another. Thus, the auxiliary power unit is no longer situated in the tail of the aircraft, and this makes it possible to avoid having to transport hydrogen in a distribution circuit along the aircraft and thus limits the risks of leakage and therefore explosion.

Figure 3:
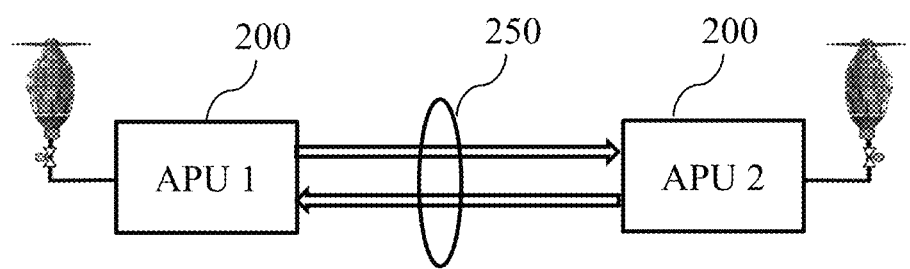
FIG. 3 is a schematic depiction of a set of two propulsion systems, each propulsion system being associated with an auxiliary power unit according to a particular embodiment.

In an embodiment variant shown in FIG. 3, the aircraft comprises as many power auxiliary units as propulsion systems 150, each auxiliary power unit and the propulsion system with which it is associated being co-located.

In this variant, the auxiliary power units are connected by a cross-feed system 250 in order to compensate for any possible malfunctioning of at least one element of an auxiliary power unit from among the compressor 10, the manifold 12, the heat exchanger 20 or 22 and/or the bleed air system 28.

This cross-feed system 250 is controlled by a processing unit. The processing unit is configured to detect a malfunction of at least one element of an auxiliary power unit and to compensate for the problem as a function of the malfunctioning element. For example, in the event of malfunctioning of the compressor and/or the manifold of the auxiliary power unit APU 1, the processing unit implements a distribution of air to the environmental control system and to the fuel cell stack of the auxiliary power unit APU 1 from the compressor and the manifold of the auxiliary power unit APU 2. In other words, the environmental control system and the fuel cell stack of the auxiliary power unit APU 1 are supplied with air by the manifold of the auxiliary power unit APU 2. Thus, the overall system is resistant to malfunctions of at least one element of an auxiliary power unit by virtue of the use of the corresponding element in the other auxiliary power unit as a replacement. This solution therefore guarantees the availability of critical functions (e.g., conditioned air, electricity, etc.). In one embodiment, the processing unit controlling the cross-feed system 250 corresponds to the processing unit controlling the manifold 12 of the first auxiliary power unit or to the processing unit controlling the manifold 12 of the second auxiliary power unit. In another embodiment, the processing unit controlling the cross-feed system 250 is independent of the processing unit controlling the manifold 12 of the first auxiliary power unit and of the processing unit controlling the manifold 12 of the second auxiliary power unit. It can, however, exchange information with these two processing units. In yet another embodiment, the processing unit controlling the cross-feed system 250, the processing unit controlling the manifold 12 of the first auxiliary power unit and the processing unit controlling the manifold 12 of the second auxiliary power unit correspond to one and the same processing unit.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An auxiliary power unit for an aircraft, comprising an air compressor coupled to an air-drawing device for drawing in air from outside the aircraft, the air compressor supplying compressed air to a manifold configured to supply air to an environmental control system and a start-up module of at least one propulsion system of the aircraft, said propulsion system being supplied with hydrogen from a tank, wherein:

said manifold is also configured to supply air to a fuel cell stack arranged so as to provide an electric generation function configured to power non-propulsive systems of the aircraft, said fuel cell stack also being supplied with hydrogen from said tank; and an inlet of said manifold is coupled to an outlet of a bleed air system configured to draw in air from said at least one propulsion system, and the manifold is controlled by a processing unit such that, when said propulsion system is operating, the manifold supplies the fuel cell stack and the environmental control system with a mixture of air coming from the compressor and from the propulsion system.

2. The auxiliary power unit according to claim 1, wherein the processing unit is also configured to command a stoppage of the compressor during operation of the propulsion system.

3. The auxiliary power unit according to claim 1, wherein the fuel cell stack is coupled to a cooling circuit in which a cooling liquid circulates, said cooling circuit being configured such that, when the fuel cell stack is operating with release of heat, said heat heats said cooling liquid.

4. The auxiliary power unit according to claim 3, wherein an outlet of said cooling circuit is coupled to an inlet of a heat exchanger, through which the hydrogen supplying said fuel cell stack circulates, such that at least a portion of said heated cooling liquid circulates in said heat exchanger and heats the hydrogen supplying said fuel cell stack.

5. The auxiliary power unit according to claim 3, wherein a portion of the hydrogen circulating through the heat exchanger supplies said at least one propulsion system during a start-up phase.

6. The auxiliary power unit according to claim 1, wherein a processing unit of said auxiliary power unit is configured to obtain information relating to air requirements of the environmental control system and of the fuel cell stack, and wherein said processing unit controls the manifold such that it supplies air to the fuel cell stack and the environmental control system as a function of said obtained information.

7. The auxiliary power unit according to claim 1, wherein at least a portion of oxygen-depleted air at an outlet of the fuel cell stack is injected into at least one compartment of said at least one propulsion system to serve as a fire barrier.

8. The auxiliary power unit according to claim 1, said auxiliary power unit and said at least one propulsion system being co-located.

9. An aircraft comprising at least one auxiliary power unit according to claim 1.

10. An aircraft comprising:

a first and a second auxiliary power unit according to claim 1, said first and second auxiliary power units being connected by a cross-feed system; and a processing unit configured to detect a malfunction of at least one element of one of the first or the second auxiliary power unit and to compensate for this malfunction by commanding the cross-feed system in such a way as to use a corresponding element in an other of the first or the second auxiliary power unit as a replacement for the malfunctioning element.

* * * * *